Figure 1:
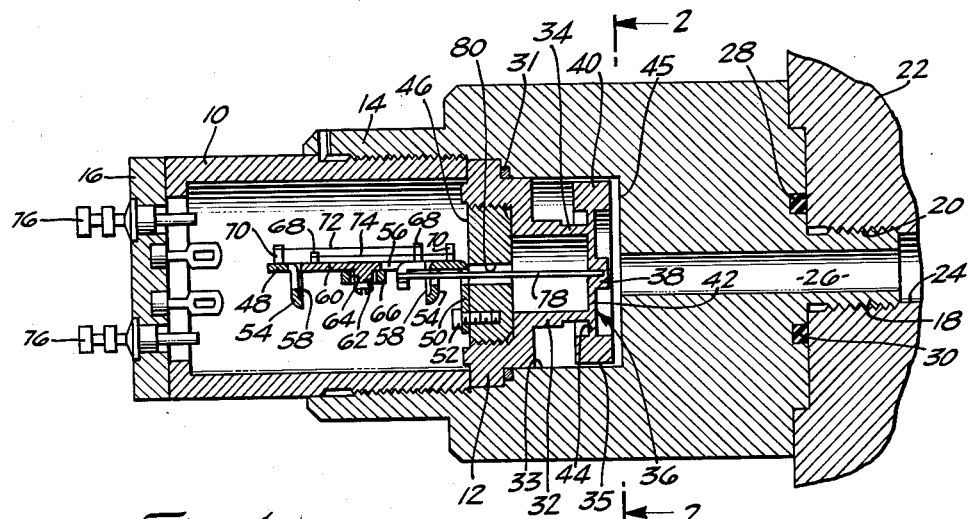

June 20, 1961   M. DI GIOVANNI   2,989,085
ACCELERATION INSENSITIVE DIAPHRAGM
Filed Nov. 4, 1957   5 Sheets-Sheet 1

INVENTOR.
MARIO DI GIOVANNI
ATTORNEYS

MARIO DI GIOVANNI
INVENTOR.

BY Philip Suthow
Max Geldin
ATTORNEYS

MARIO DI GIOVANNI
INVENTOR.

BY
ATTORNEYS

MARIO DI GIOVANNI
INVENTOR.

ATTORNEYS

June 20, 1961 M. DI GIOVANNI 2,989,085
ACCELERATION INSENSITIVE DIAPHRAGM
Filed Nov. 4, 1957

INVENTOR.
MARIO DI GIOVANNI
BY
ATTORNEY

United States Patent Office 2,989,085
Patented June 20, 1961

2,989,085
ACCELERATION INSENSITIVE DIAPHRAGM
Mario Di Giovanni, Pacific Palisades, Calif., assignor to Statham Instruments, Inc., Los Angeles, Calif., a corporation of California
Filed Nov. 4, 1957, Ser. No. 694,382
9 Claims. (Cl. 137—793)

This invention relates to a novel diaphragm structure rendering the diaphragm insensitive to acceleration, and especially adapted to be employed as the sensitive element in transducers or instruments for measuring forces, movements, fluid pressures, and the like.

This application is a continuation-in-part of my applications Serial Nos. 515,111, now Patent No. 2,840,675 and 515,196, now abandoned, both filed June 13, 1955, and 627,375, filed December 10, 1956.

When a diaphragm is employed as the sensitive element of an instrument such as a transducer, means are connected to said diaphragm for sensing the deflection thereof. Such means may be in the form of an unbonded electrical resistance strain wire, or an inductive or capacitance type motion sensing means.

When an instrument containing a displaceable diaphragm is subjected to acceleration, since the diaphragm has mass, the diaphragm will tend to be displaced an amount proportional to such acceleration. Where, for example, the instrument is a pressure gage, such forces of acceleration will cause the addition or subtraction of an extraneous component of displacement of the diaphragm, to or from the displacement of the diaphragm produced by the pressure being measured, giving an inaccurate and spurious measurement of the pressure as result of the sensitivity of the diaphragm to acceleration.

In the devices described and claimed in the aforementioned copending applications, the diaphragm is mounted on a flexible support or flexure, such flexible support or flexure being connected to the diaphragm at spaced points intermediate the ends of the diaphragm, to provide spaced and localized points of bending in the flexure member intermediate the ends of the diaphragm and at an angle thereto. Thus the diaphragm has an overhanging end portion beyond its supporting flexure member. A force or pressure to be measured can be applied either to the central portion of the diaphragm within the flexible support or to the outer peripheral portion beyond such flexure, causing the diaphragm to deflect from an approximately flat configuration into a shape approximating that of a spherically shaped cap.

In accomplishing the objects of the present invention, I have found that by designing the diaphragm so that the outer portion of the diaphragm beyond the supporting flexure or flexible end members has a mass and stiffness substantially equal to the mass and stiffness of the central portion of the diaphragm between such end members, these balancing masses of the diaphragm cancel out any tendency toward displacement of the diaphragm due to acceleration. Thus, when an accelerating force is applied to the diaphragm, the outer or overhanging portions of the diaphragm beyond the supporting flexure or flexure members tend to bend in one direction about said members, and the central portion of the diaphragm between such members tends to bend in the same direction about said supporting members, producing essentially equal and opposite moments of force about said flexure members and resulting in substantially no net displacement of the diaphragm, as seen more clearly hereinafter.

According to one embodiment, the mass of the outer portion of the diaphragm is made equal to that of the central portion of the diaphragm by adding metal or thickening the peripheral outer portion of the diaphragm beyond the flexure members, while in another embodiment, the central portion of the diaphragm has metal added thereto to increase the thickness of such central portion. This thickening feature not only functions to substantially reduce or eliminate the effect of acceleration on the diaphragm, but also aids in reinforcing the diaphragm.

The mass of the outer and central portions of the diaphragm is intended to include the mass of any other structural elements which may be mounted on such diaphragm portions. Thus, where the diaphragm carries supporting arms or pns between which an unbonded electrical strain wire is looped in tension, or carries other motion sensing members, the mass and stiffness of these support members should be so chosen in relation to the mass of the diaphragm and its stiffness, as to aid in canceling out any displacement of the diaphragm due to acceleration forces.

Figure 2:
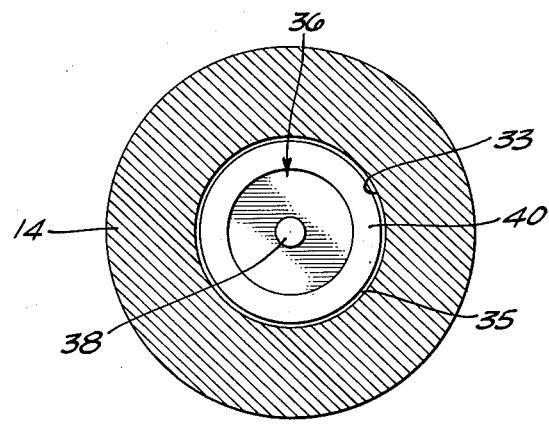
Figure 3:
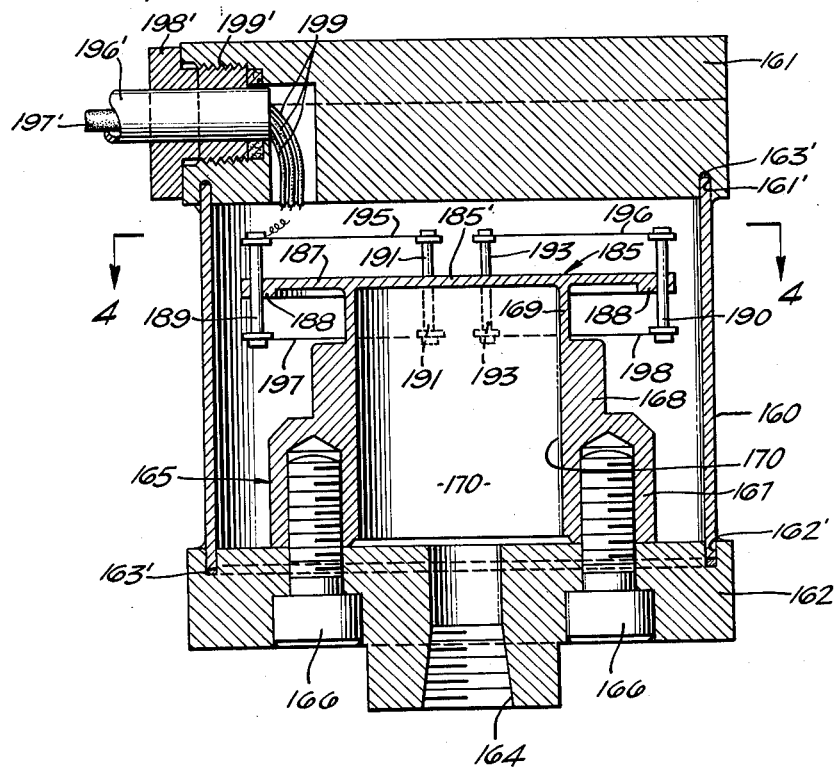
Figure 4:
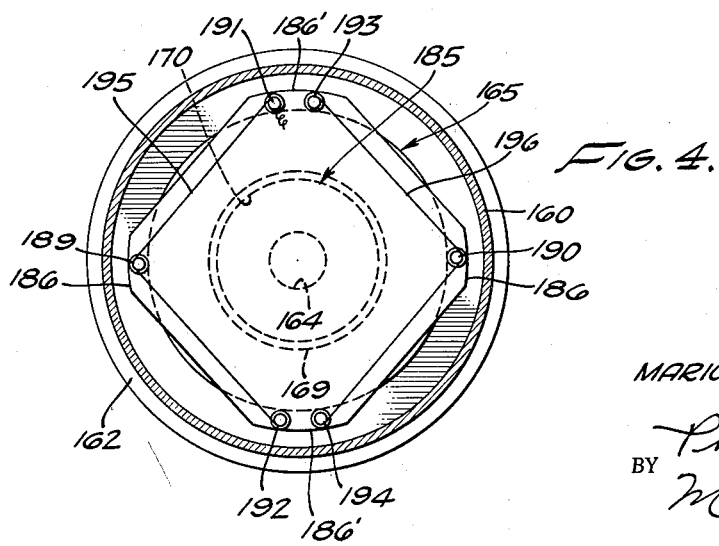
Figure 5:
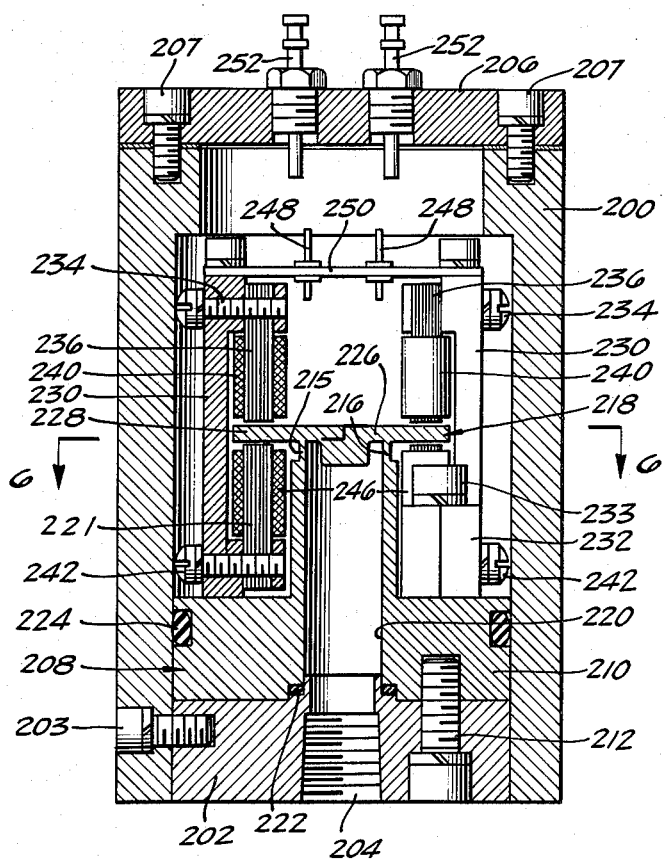
Figure 6:
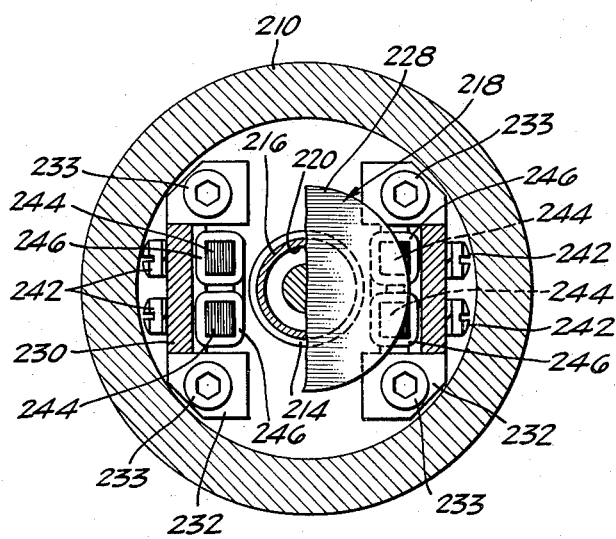
Figure 7:
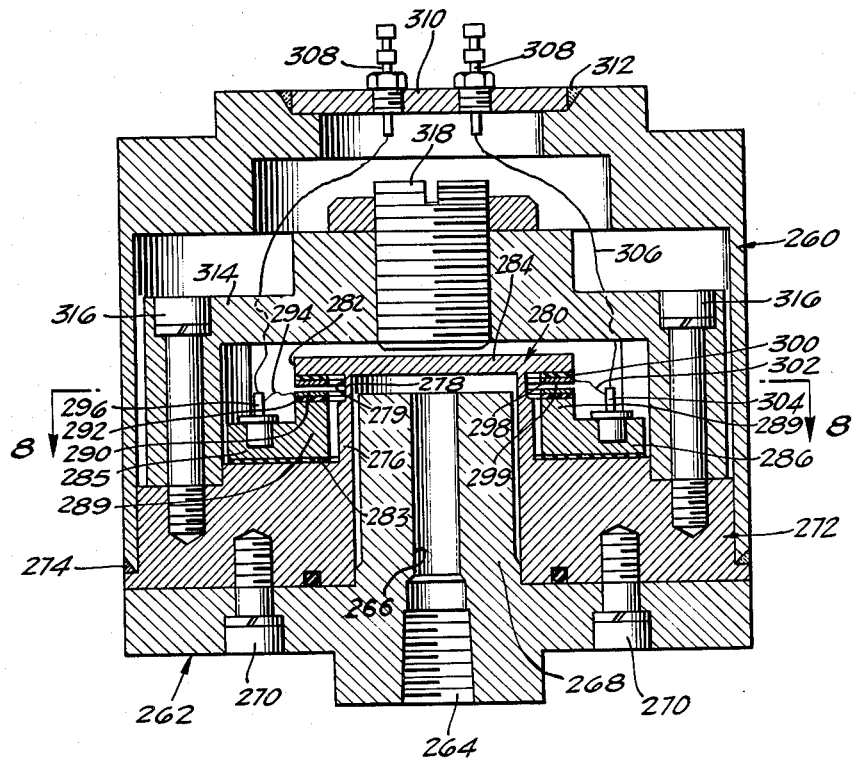
Figure 8:
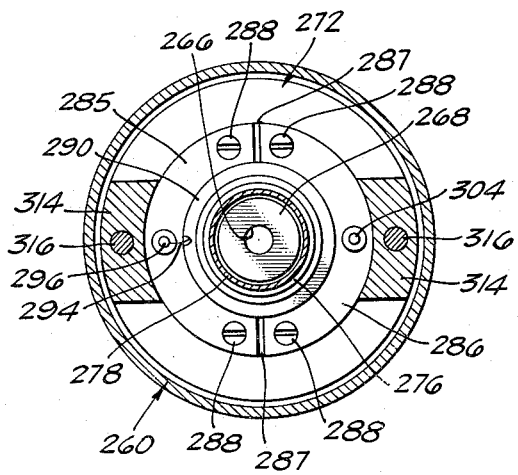
Figure 10:
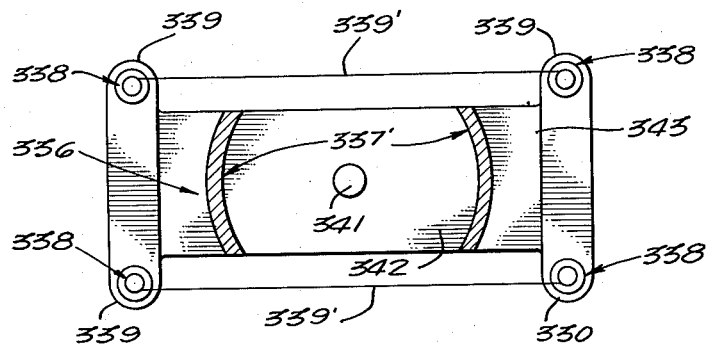
Figure 9:
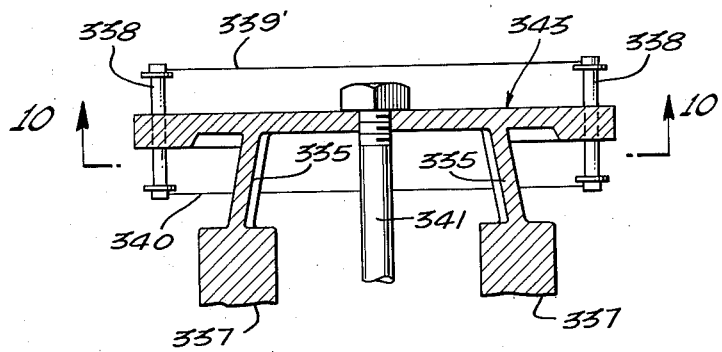

The invention will be more readily understood from the description below taken in connection with the accompanying drawings, wherein:

FIG. 1 is a longitudinal section of a pressure gage incorporating one embodiment of the invention diaphragm;
FIG. 2 is a transverse section taken on line 2—2 of FIG. 1;
FIG. 3 is a section in elevation of another pressure gage embodying a diaphragm according to the invention;
FIG. 4 is a section taken on line 4—4 of FIG. 3;
FIG. 5 is a sectional elevation of still another pressure transducer employing another embodiment of my diaphragm;
FIG. 6 is a section taken on line 6—6 of FIG. 5;
FIG. 7 is a sectional elevation of still another device employing another embodiment of the invention diaphragm;
FIG. 8 is a section taken on line 8—8 of FIG. 7;
FIG. 9 is a schematic illustration of another embodiment of the invention; and
FIG. 10 is a view taken on line 10—10 of FIG. 9.

Referring to FIGS. 1 and 2, illustrating one embodiment of the invention for measuring pressures, the principal working parts of the instrument are enclosed in a cylindrical housing including cylindrical members 10, 12 and 14. The three members 10, 12 and 14 are threadably interengaged as shown. The end piece 16 is connected to member 10 in any suitable manner, e.g., as by welding. The pressure fitting 14 has a rear central flange 18 which threadably engages an internal bore 20 in an external pressure connection 22. A counterbore 24 in member 22 communicates with an axial bore 26 in the pressure member 14 for introducing pressure fluid into the instrument. A sealing ring 28 is disposed in a groove 30 at the rear portion of member 14 and abutting the adjacent end of member 22, and a ring seal 31 is disposed between the inner engaging shoulders of members 12 and 14, as shown.

Cylindrical fitting 12 carries an axial cylindrical flange 32, which extends into a bore 33 formed axially in member 14. The outer end of flange 32 is reduced in thickness to form a flexible support 34, and a flexible diaphragm 36 is integrally connected to the reduced outer end 34 of flange 32, and is supported thereon. The diaphragm 36 is thickened to form a boss 38 at its center and the outer peripheral portion of the diaphragm beyond the support 34 thereof, is increased in thickness to form a peripheral bead or flange 40 about the diaphragm. The diaphragm 36 is carefully designed so that the mass of the central portion 42 of the diaphragm within the cylindrical support 34, and including the boss 38, has a mass substantially equal to the outer portion 44 of the diaphragm beyond the support 34, and including the peripheral flange 40 according to the invention. The peripheral outer edge of the diaphragm 36 is spaced from the wall of bore 33 to provide a sufficient clearance 35 for movement of the peripheral flange 40 in response to displacement of the diaphragm. The outer side of diaphragm 36 is disposed adjacent the inner end wall 45 of the bore 33, and the pressure fluid inlet 26 communicates with bore 33 in axial alignment with the central boss 38 on diaphragm 36.

A cylindrical support 46 is threadably engaged with the cylindrical member 12. Firmly attached to support 46 is a transducer frame 48, the frame being provided with a bracket 50 for attachment to the support 48 by means such as bolts 52. A pair of integral ears 54 extend downwardly from frame 48. Between these ears there is formed a central aperture 56 in the frame. Each of the ears 54 is bent over at its outer end to form a portion for attachment to one of a pair of flat springs 58. Each spring 58 is attached adjacent its opposite edge to one end of a suspended table member 60 filling the major portion of the space formed by opening 56. By this construction the table 60 is permitted motion by means of flexible springs 58 in an axial direction. The amount of such axial motion of table 60 is restricted by means of a pin 62 rigidly mounted in table 60. This pin rides in a hole 64 formed in a yoke 66 attached to frame 48, the clearance between the pin 62 and the left and right edges of the hole 64 being the amount of permitted motion of table 60.

The table 60 carries a pair of spaced insulated pins 68, and the frame 48 carries a pair of spaced insulated pins 70, and between one pair of pins 68 and 70 is looped in tension an electrical resistance strain wire 72, and between the other pair of pins 68 and 70 is stretched in tension a strain wire 74. The ends of these wires are connected to insulated terminals 76 to form a bridge circuit in a manner well understood in the art. Movement of table 60 to the right causes wire 72 to increase in tension and wire 74 to be relaxed, and vice versa on movement of table 60 in the opposite direction. Movement of table 60 in response to application of the pressure fluid against diaphragm 36 is effected through a rod 78 attached at one end to table 60 and at the other end to the central boss 38 of the diaphragm, said rod being disposed axially of members 12 and 46, and passing through a central aperture 80 in member 46 to permit sufficient clearance for axial motion of rod 78. The strain wire transducer structure of FIG. 1 just described is similar to that described in U.S. Patent 2,573,286, and forms no part of the instant invention.

It will be seen that if the instrument of FIG. 1 is subjected to linear acceleration in an axial direction to the right, the outer peripheral portion 44 of diaphragm 36 beyond member 34 will tend to bend to the left. However, at the same time, the central portion 42 of the diaphragm within the support 34 will also tend to bend to the left. These bending tendencies of the central and outer portions 42 and 44 of the diaphragm will cancel each other out, since the masses of these respective portions are substantially equal, and there will be little or no resultant change in resistance of the strain wires 72 and 74 due to acceleration of the instrument to the right. The same result is realized when the instrument of FIG. 1 is subjected to a linear acceleration to the left.

Referring now to FIGS. 3 and 4, there is provided a cylindrical case 160, the upper end of which is received in a notch 161' of a heavy pressure cap 161, and the lower end of which is received in a notch 162' of a thick pressure member 162. A gasket 163' is disposed in each of notches 161' and 162' adjacent the ends of the case 160. Pressure member 162 has a fluid pressure inlet 164. A stepped pressure chamber 165 of cylindrical shape is axially positioned within case 160 adjacent the lower pressure member 162 and is connected thereto by means of bolts 166. Pressure chamber 165 has a thick lower portion 167, an intermediate portion 168 of decreased thickness, and a thin flexible upper portion 169 of cylindrical shape, and the bore 170 of chamber 165 communicates with the pressure fluid inlet 164.

A diaphragm 185 substantially in the form of a square with its corners rounded off as at 186 and 186' (see FIG. 4) is integrally connected between the adjacent ends of the thin portion 169 of the pressure chamber 165. It is seen that the diaphragm 185 has an outer peripheral portion 187 extending beyond the thin wall section 169 of the pressure chamber. Adjacent its peripheral edge the diaphragm is increased in thickness as shown at 188, and thickened peripheral portion 188 receives and holds in position a pair of oppositely disposed insulated pins 189 and 190 located near the two opposite rounded corners 186 of the diaphragm, and two pairs of oppositely disposed pins 191 and 192, and 193 and 194, said pairs of pins being positioned adjacent the two other oppositely disposed rounded corners 186' of the diaphragm. Pins 191 and 193 in one corner 186' of the diaphragm are located closely adjacent but spaced from each other, as are pins 192 and 194 in the opposite corner 186'. The pins pass through apertures in the diaphragm forming a press fit therewith, and said pins are positioned normal to the plane of the diaphragm, extending a substantially equal distance above and below the same.

Stretched in tension between the upper ends of pins 191, 189 and 192 is an electrical resistance strain wire 195, and stretched in tension between the upper ends of pins 193, 190 and 194 is a strain wire 196. A strain wire 197 is connected in tension between the lower ends of pins 191, 189 and 192, and a fourth strain wire 198 is connected between the lower ends of pins 193, 190 and 194. It is noted that strain wires 195 and 196 are located in a plane above the diaphragm 185 and parallel thereto, while strain wires 197 and 198 are disposed in a plane below diaphragm 185 and parallel thereto.

The ends of the strain wires 195, 196, 197 and 198 are connected to form a Wheatstone bridge circuit in a manner well understood in the art, the four strain wires forming the arms of the bridge. Wires 199 connect the bridge with a plug 196', from which such wires are conducted externally within a cable 197'. The plug 196' is received within a flanged sleeve 198' which is threaded at 199' into the pressure cap 161.

The diaphragm 185 is designed so that the sum of the mass and stiffness of the outer end 187 of the diaphragm including the flange 188 and the mass and stiffness of the pins 189, 190, 191 and 193, is substantially equal to the mass and stiffness of the central portion 185' of the diaphragm between the flexure 169.

It will be seen that if the instrument is subjected to linear acceleration in a direction normal to the plane of diaphragm 185, e.g., downward as viewed in FIG. 3, the outer portions 187 of the diaphragm beyond the supporting flexible end member 169, tend to bend upward to pivot arms 188, 190, 191 and 193 so as to bring the upper ends thereof closer together while tending to move the lower ends thereof away from each other. But this tendency toward upward bending of the end portions 187 of the diaphragm and the pivoting of said arms is substantially canceled out by upward bending of the central portion 185' of the diaphragm, which tends to cause the outer end portions 187 of the diaphragm to bend downward against the tendency toward upward bending thereof due to acceleration. Hence, there is substantially no resultant change in resistance of the strain wires due to acceleration, and thus essentially no error in output is introduced due to acceleration of the instrument.

Referring to FIGS. 5 and 6, showing another modification employing an inductive type motion sensing means, numeral 200 represents the outer case having a plug 202 connected at one end thereof by means of studs 203, said plug having a central fluid pressure inlet 204, and a cover 206 connected by suitable fasteners 207 to the other end of case 200. A pressure fluid housing 208 is positioned within the case, and comprises a thick base portion 210 resting on the upper surface of plug 202 and fixed thereto by a stud 212, and an integral upper section 214 of reduced wall thickness. The upper end of wall section 214 is reduced still further by formation of a groove 215 therein to form a flexible cylindrical support 216 for a circular diaphragm 218. The pressure inlet 204 communicates with the cylindrical interior chamber 220 of housing 208. An O-ring seal 222 is provided in a groove between the lower end of housing 208 and the upper surface of plug 202, and a seal 224 is also provided between the outer periphery of base member 210 and the inner wall of the case.

Diaphragm 218 is positioned axially above the cylindrical chamber 220 and is formed integral with flexible support member 216. Support member 216 is positioned intermediate the ends of the diaphragm, the center section 226 thereof being within support 216, and the outer peripheral portion 228 of the diaphragm being located outside said support. The diaphragm 218 is designed so that the mass and stiffness of the outer portion 228 of the diaphragm are respectively substantially equal to the mass and stiffness of the central portion 226 of the diaphragm. The diaphragm is formed of a material having suitable magnetic permeability, e.g., iron, to function as an armature in a magnetic circuit as pointed out more fully below.

A vertical plate 230 having a pair of integral feet 232 at the bottom of the plate, is positioned on base member 210 at one side of diaphragm 218 with the feet 232 connected to base member 210 by fasteners 233. Supported from the upper end of plate 230 by a pair of screws 234 are a pair of depending laminated posts 236 spaced from each other. Posts 236 each have mounted thereon a coil 240, the ends of coils 240 being connected together. Carried by a pair of screws 242 at the bottom of plate 230 are a second pair of vertical laminated posts 244 like 236 and in axial alignment therewith. Posts 244 each carry a coil 246, the ends of coils 246 being connected together.

Directly opposite diaphragm 218 from the arrangement of coils and associated structure described above, and positioned to the right as seen in FIG. 5, is a similar arrangement of coils and associated structure, like numerals thereof representing like parts of the coil structure previously described. Thus it will be seen that there are four coils 240 mounted above the diaphragm adjacent the outer periphery of the upper surface thereof, two on each side of the diaphragm, and four coils 246 are positioned below the diaphragm adjacent the periphery of the lower surface thereof, the lower coils being aligned with the upper coils. The ends of the wires of each pair of the four pairs of adjacent coils 240 or 246 are connected by wires (not shown) to terminals such as 248 mounted on a plate 250 positioned on plates 230, to form a bridge circuit, each pair 240 or 246 of the four pairs of adjacent coils constituting one arm of the bridge. Terminals 248 are in turn connected to outer terminals 252 by additional leads (not shown) for connection to a source of potential and an indicating instrument, e.g., a galvanometer, in a well known manner.

Pressure fluid introduced into chamber 220 via inlet 204 causes an upward flexing of the central portion 226 of diaphragm 218 on the flexure 216, and a downward bending of the outer portion 228 of the diaphragm beyond the flexure 216. This will cause the periphery of the diaphragm to approach the upper ends of the lower laminated cores 244 of all four lower coils 246, and to move away from the lower ends of the upper laminated cores 236 carrying coils 240. This decreases the length of the gaps between the diaphragm and the adjacent ends of the lower pole pieces 244 and increases the length of the gap between the diaphragm and the adjacent ends of the upper pole pieces 236. This produces a change in the reluctance in the magnetic paths about the respective coils, the diaphragm serving as armature, and causes a change in inductance of the coils 240 and 246 and in the output of the bridge, in proportion to the amount of bending imparted to diaphragm 226 by the pressure in chamber 220.

Should the instrument be subjected to acceleration in a direction normal to the diaphragm 218, since the mass and stiffness of the outer portion 228 of the diaphragm are substantially equal, respectively, to the mass and stiffness of the central portion 226 of the diaphragm, the tendency of said central portion to flex in one direction will be offset by an equal tendency of the outer diaphragm portion to flex in the opposite direction. The net result will be that substantially no flexing of the diaphragm occurs as the result of such acceleration, and the instrument is thus rendered substantially insensitive thereto.

Where the fluid whose pressure is to be measured in chamber 220 is corrosive to the material of high magnetic permeability of which the diaphragm is formed, the diaphragm can be made in two parts. Thus, the central portion 226 of the diaphragm can be formed of a material which is not attacked by the pressure fluid, and the outer overhanging peripheral portion 228 of the diaphragm which is not contacted by the pressure fluid, can be formed of a separate magnetically permeable material, the outer ring portion 228 being connected in any suitable manner to the periphery of the central diaphragm portion 226.

Now referring to FIGS. 7 and 8, numeral 260 represents a case, the lower end of which is closed by a pressure cap 262 connected to the bottom of the case in the manner noted below. Pressure cap 262 has a central pressure inlet 264 which communicates with a conduit or chamber 266 formed axially in an upwardly extending cylindrical portion 268 integral with cap 262. Connected to cap 262 by cap screws 270, and disposed about the cylindrical portion 268, is a base member 272. Member 272 is secured by welding at 274 to the lower end of case 260, to thereby support both 272 and the cap 262.

Base 272 has an upwardly extending cylindrical section 276 disposed about the upper end of cylindrical portion 268, wall section 276 being reduced at its upper end by formation of a groove 279 in wall 276, to form a flexible cylindrical support 278 for a circular diaphragm 280. Diaphragm 280 is positioned axially above cylinder 268 and chamber 266 therein, and is integral with flexible support 278. Support 278 is positioned within the outer periphery of diaphragm 280 so that the outer peripheral portion 282 thereof overhangs the support 278 and the central portion 284 of the diaphragm is disposed within said support.

A pair of semicircular supporting plates 285 and 286 are positioned on base member 272 and disposed about the upper cylindrical section 276 thereof, plates 285 and 286 being connected to said base member by screws 288. Plates 285 and 286 are insulated from base 272 by a sheet of insulation 283 disposed between said plates and base member 272. These plates are separated at their adjacent ends indicated at 287. Connected about raised inner peripheral portions 289 of plates 285 and 286 is a circular condenser plate 290, suitable insulation material indicated at 292 being disposed between said raised peripheral portions and plate 290. A lead 294 connects condenser plate 290 to a terminal 296 on plate 285. Carried on the lower surface of the outer peripheral portion 282 of diaphragm 280 is a second condenser plate 298, said plate being separated from the diaphragm by suitable insulation material indicated at 300. The condenser plates 290 and 298 are separated from each other by an air gap 299. Condenser plate 298 is connected by a lead 302 to a second terminal 304 positioned on the lower condenser plate support 286. Leads 306 connect terminals 296 and 304 with a pair of external terminals 308 mounted on a cover 310 soldered at 312 to the top of the case. Thus, plates 290 and 298 form a condenser having an air gap 299, said condenser being in a circuit including terminals 308, which are connected externally in known manner to a source of potential and an indicating instrument, both not shown.

It is noted that the diaphragm 280 and condenser plate 298 are designed so that the mass of the outer peripheral portion 282 of the diaphragm and the mass of condenser plate 298 together, are substantially equal to the mass of the central portion 284 of the diaphragm, and so that said central portion of the diaphragm has a stiffness substantially equal to said outer peripheral portion of the diaphragm.

A yoke 314 is positioned over the diaphragm 280 and connected adjacent the outer periphery of base member 272 by screws 316. An adjustable stop screw 318 is positioned centrally in said yoke above the center of diaphragm 280 to limit the outer deflection thereof.

Pressure fluid introduced into chamber 266 via inlet 262 will cause the central portion 284 of diaphragm 280 to flex or bulge upwardly, producing a corresponding downward deflection of the outer peripheral portion 282 of the diaphragm carrying condenser plate 298. This causes the upper condenser plate 298 to approach the lower condenser plate 290, thereby changing the distance between these plates across gap 299. The result is a change in capacitance of the condenser which is indicated in the external circuit, corresponding to the deflection of diaphragm 280 and the pressure in chamber 266.

Since the combined masses of the outer portion 282 of the diaphragm and the condenser plate 298 carried thereby are made substantially equal to the mass of the central portion 284 of diaphragm 280, and since the stiffness of said outer peripheral and central portions of the diaphragm are designed to be essentially the same, any acceleration of the instrument along the axis of the diaphragm will tend to produce equal but opposite deflection of the outer portion 282 and the central portion 284 of the diaphragm, resulting in substantially zero deflection of the diaphragm, and rendering the instrument insensitive to such acceleration.

It will be understood that the diaphragm may have any suitable shape. Thus, it may be circular as shown in FIGS. 2, 4 and 8, or it may be elliptical oblong, rectangular, square or diamond shaped as illustrated in FIG. 4, or any other desirable geometric configuration.

Also, the flexure member for supporting the diaphragm, e.g., members 34, 169, 215, or 278, although shown as disposed at substantially right angles to the diaphragm, may be positioned at an acute angle other than 90° to the diaphragm. Also, while the above mentioned flexure members for supporting the diaphragm are shown as cylindrical and intersect the diaphragm along a circle, such flexure member may be in the form of two or more spaced flexure members each having an arcute cross section and intersecting the diaphragm along spaced arcs, as described in my copending application Serial No. 515,111, now Patent No. 2,840,675.

Thus, as seen in FIGS. 9 and 10, the flexible supports 335 supporting the flexible beam or diaphragm 336 can be disposed at an acute angle thereto, such flexible supports in turn mounted on rigid supports 337. Supports 335 have an arcuate cross section, as seen in FIG. 10 and intersect beam 336 along arcs shown at 337'. Members 335 thus form two opposite arcuate flexures extending between the outside edges of the beam 336. Pins 338 are mounted in outer end members 339 of the diaphragm, and strain wires 339' and 340 are connected across the upper and lower ends, respectively, of the pins. A force transmitting rod 341 is threaded into the center of beam 336. When the beam 336 is subjected to an upward or downward force by rod 341 so as to deflect the beam 336 upward or downward, the resistance of strain wires 339' and 340 will change, due to change in tension therein as result of deflection of the beam 336 in proportion to the force transmitted by rod 341.

From the foregoing, it is seen that I have designed a diaphragm structure especially adapted for use in transducers such as pressure gages and other instruments for measuring forces, movements and the like, said diaphragm being designed to substantially eliminate response of the diaphragm and instrument to forces of acceleration to which the instrument may be subjected in use, thus greatly reducing errors in the physical characteristics being measured such as force and pressure, and rendering the instrument substantially non-responsive to such acceleration forces.

While I have described particular embodiments of my invention for the purpose of illustration, it should be understood that various modifications and adaptations thereof may be made within the spirit of the invention as set forth in the appended claims.

I claim:

1. A structure which comprises a diaphragm and a flexure means connected to said diaphragm at spaced points intermediate the outer periphery thereof, said flexure means being disposed at an angle to said diaphragm, said diaphragm including the outer peripheral portion thereof deflecting on said flexure means, the mass of the outer peripheral portion of said diaphragm beyond said flexure means being substantially equal to the mass of the central portion of said diaphragm within said flexure means.

2. A structure which comprises a diaphragm and a flexure means connected to said diaphragm at spaced points adjacent to and spaced from the outer periphery of said diaphragm, said flexure means being disposed at an angle to said diaphragm, said diaphragm including the outer peripheral portion thereof deflecting on said flexure means, the mass and stiffness of the outer peripheral portion of said diaphragm beyond said flexure means being substantially equal to the mass and stiffness of the central portion of said diaphragm within said flexure means.

3. A structure which comprises a diaphragm and a flexure means connected to said diaphragm at an angle intermediate the outer periphery thereof, said diaphragm extending beyond said flexure means, said flexure means having an arcuate cross section and intersecting said diaphragm along spaced arcs intermediate the outer periphery of said diaphragm, said diaphragm being adapted to bend along lines of flexure radially of said arcs, the mass of the outer peripheral portion of said diaphragm beyond said flexure means being substantially equal to the mass of the central portion of said diaphragm within said flexure means.

4. A structure which comprises a diaphragm and a flexure member, said flexure member having a circumambient wall connected to said diaphragm, said diaphragm extending beyond said wall, said wall being flexible along a circumambient area of flexure, said diaphragm within said wall deflecting in a direction opposite to the direction of deflection of the outer end of said diaphragm beyond said wall, the mass on one side of said diaphragm from said flexure member being substantially equal to the mass on the other side of said diaphragm from said flexure member.

5. A structure which comprises a diaphragm and a flexure means connected to said diaphragm at an angle normal thereto and intermediate the outer periphery thereof, said diaphragm extending beyond said flexure means, said flexure means having an arcuate cross section and intersecting said diaphragm along spaced arcs intermediate the outer periphery of said diaphragm, said diaphragm being adapted to bend along lines of flexure radially of said arcs, the mass and stiffness of the outer peripheral portion of said diaphragm beyond said flexure means being substantially equal to the mass and stiffness of the central portion of said diaphragm within said flexure means.

6. A structure which comprises a diaphragm and a flexure member, said flexure member having a circumambient wall connected to said diaphragm substantially normal thereto, said diaphragm extending beyond said wall, said wall being flexible along a circumambient area of flexure, said diaphragm within said wall deflecting in a direction opposite to the direction of deflection of the outer end of said diaphragm beyond said wall, the mass and stiffness of the outer peripheral portion of said diaphragm beyond said flexure member being substantially equal to the mass and stiffness of the central portion of said diaphragm within said flexure member.

7. A structure as defined in claim 2, wherein the outer peripheral portion of said diaphragm beyond said flexure means is increased in thickness.

8. A structure as defined in claim 2, wherein the central portion of said diaphragm within said flexure means is increased in thickness.

9. A structure as defined in claim 4, wherein the outer periphery of said diaphragm beyond said circumambient wall is in the form of a thickened flange.

References Cited in the file of this patent
UNITED STATES PATENTS

| | | |
|---|---|---|
| 2,361,915 | Allen | Nov. 7, 1944 |
| 2,767,584 | Franzel et al. | Oct. 23, 1956 |